INVENTORS
FREDERICK J. KOVAC
GROVER W. RYE
PAUL E. HELMS, JR.

Jack M. Young
ATTORNEY

Sept. 15, 1970　　　F. J. KOVAC ET AL　　　3,529,048
METHOD FOR PROCESSING OF PNEUMATIC TIRES
Filed Aug. 1, 1968　　　　　　　　　　　3 Sheets-Sheet 2

INVENTORS
FREDERICK J. KOVAC
GROVER W. RYE
PAUL E. HELMS, JR.

Jack M. Young
ATTORNEY

Sept. 15, 1970   F. J. KOVAC ET AL   3,529,048
METHOD FOR PROCESSING OF PNEUMATIC TIRES
Filed Aug. 1, 1968   3 Sheets-Sheet 3

INVENTORS
FREDERICK J. KOVAC
GROVER W. RYE
PAUL E. HELMS, JR.

Jack M. Young
ATTORNEY

United States Patent Office 3,529,048
Patented Sept. 15, 1970

3,529,048
METHOD FOR PROCESSING OF PNEUMATIC TIRES
Frederick J. Kovac, Akron, and Grover W. Rye and Paul E. Helms, Jr., Cuyahoga Falls, Ohio, assignors to The Goodyear Tire & Rubber Company, Akron, Ohio, a corporation of Ohio
Filed Aug. 1, 1968, Ser. No. 749,362
Int. Cl. B29h 5/02
U.S. Cl. 264—94    17 Claims

ABSTRACT OF THE DISCLOSURE

A processing method for conditioning pneumatic tires wherein each tire is conditioned for its final intended use after being removed from the vulcanizing mold and before cooling to ambient temperature by applying a load, such as a radial load, to the tire tread while the tire is inflated and at the same time relatively moving the load and tire, such as by rotating the tire, to cause deflection along successive circumferential tire increments.

---

The foregoing abstract is not to be taken as limiting the invention of this application, and in order to understand the full nature and extent of the technical disclosure of this application, reference must be made to the accompanying drawings and the following detailed description.

BACKGROUND OF THE INVENTION

This invention relates to the manufacture of pnuematic tires and particularly to an improved tire processing method which includes conditioning a tire after its removal from a vulcanizing mold to obtain more uniform physical characteristics in the finished tire. The method is especially suited to the manufacture of tires formed of any kind of tire cord, comprising: (1) tire cord capable of exhibiting permanent changes in physical properties upon application of load and heat, including cotton, rayon, nylon, polyester, or other man-made synthetic or textile cord; (2) relatively non-changeable tire cord, including fiber glass, metal wire, etc. cord; or (3) any other suitable tire cord, whether the tire be made of only one kind of the above-named tire cords or of a combination of any two or more of the above-named kinds of tire cords.

In the present manufacture of conventional pneumatic passenger car and truck tires having reinforcing tire cords embedded in rubber, wherein superposed plies of some of these tire cords extend either diagonally or radially through the tire carcass from bead to bead with or without other of these tire cords in a circumferential belt under the tire tread, an uncured tire is processed in a vulcanizing mold by being molded and shaped or formed at a curing temperature that may be in excess of 300° F. Normally the tire is kept in the mold for from ten to twenty minutes.

While a substantial part of the curing or vulcanizing of the rubber is accomplished while the tire is in the mold, the curing is in most cases by no means complete when the tire is removed. Moreover the curing process generally continues for several hours at a rate which decreases as the tire cools to ambient air temperature. During this curing and cooling of the rubber after removal from the mold, the tire is, according to some manufacturing procedures, inflated so as to provide in the tire carcass approximately the same, or greater, stresses as would be experienced under static service conditions without an external load.

It has been found, however, that many tires made according to the above methods have deficiencies in structural uniformity which are manifested for example in circumferential variations in the structural resistance to radial and lateral forces acting on the tire during dynamic operation under load. It is believed that these deficiencies derive from differences in cord lengths or in tension in the reinforcing cords, differences in tread splice, or unevenness of rubber coating induced by non-uniform assembling of the tire or the high temperatures in the mold. The heat probably causes thermal shrinkage and variations in the condition of the textile fibers.

Such variations in tire uniformity may be undesirable with respect to the ride characteristics experienced by the driver and passengers in the vehicle on which the tire are mounted.

The tire processing method of the present invention substantially reduces the disadvantages indicated above and affords other features, advantages and superior quality tires not obtainable from the prior art.

SUMMARY OF THE INVENTION

It is among the objects of the invention to improve the structural uniformity of pneumatic tires and particularly the stress uniformity of the reinforcing tire cords in the tire carcass.

Another object is to reduce circumferential variations in the structural resistance of pneumatic tires to radial and lateral forces acting on a tire when rotated under load.

A further object is to provide an improved method for manufacturing pneumatic tires wherein greater structural uniformity is provided in the tires and fewer are rejected for non-uniformity.

These objects and others are achieved according to the improved processing method of the invention wherein, in addition to the conventional steps of building an uncured tire of superposed plies, with or without a circumferential belt, of tire cords embedded in rubber and surrounded by a circumferential tread band, processing the tire in a vulcanizing mold and thereafter inflating the formed tire shortly after it is removed from the mold: an exterior load, such as a radial load, is promptly applied, while the inflated tire is still relatively hot, at an exterior location on the tire, such as on the tread band, and relative movement is caused between the tire and the location of the load to flex or to deflect the tire inwardly at successive circumferential increments.

The load is preferably a radial load applied by means of a cylindrical roller of sufficient diameter to flex a tread increment advancing around the tire as the tire is rotated, and the conditioning steps are advantageously begun as quickly as possible, not more than within a few minutes, after the tire is removed from the mold. Also the time interval of the conditioning is preferably from one to two times the duration of the vulcanizing mold cycle and the inflation pressure should be from a low pressure to a high pressure, less than the bursting pressure, with these low and high pressures being respectively about 20 p.s.i. (pounds per square inch) and 40 p.s.i. for some conventional passenger car tires. The inflation pressure is preferably of the general order of the service pressure; and is used to maintain the shape of the tire, and to apply opposite loading to the tire cords during application of the radial load thereto.

These tire conditioning steps help obtain a more uniform tension in the tire cords while the curing or vulcanizing process continues while the hot tire is being cooled after removal from the mold.

It is believed that this tire conditioning process may have one or more of the following actions on the hot tire for improving the uniformity of the tire. First, the aforementioned tire cords capable of exhibiting permanent changes in physical properties upon application of load and heat are alternatively stretched by the load and relaxed while hot to make generally uniform the stresses in the fibers thereof independently of whether or not rubber curing or vulcanizing is occurring. If rubber vulcanizing or curing is still occurring during this conditioning process after the tires have been removed from the mold, the following second and/or third action may occur. Second, any of the separate plies or belt of tire cords in the tire may move relative either to the other plies or belt or to the surrounding rubber to make uniform the stresses therebetween. Third, different portions of any kind of tire cord in any belt or ply may move relative to each other or to portions of the surrounding rubber to make generally uniform the stresses in the cord in the tire even though the cord does not permanently change its physical characteristics.

Other objects, uses and advantages of the invention will appear from the following detailed description and drawings which illustrate an apparatus for practicing the improved processing method of the invention.

DESCRIPTION OF THE PREFERRED EMBODIMENTS

Figure 1:
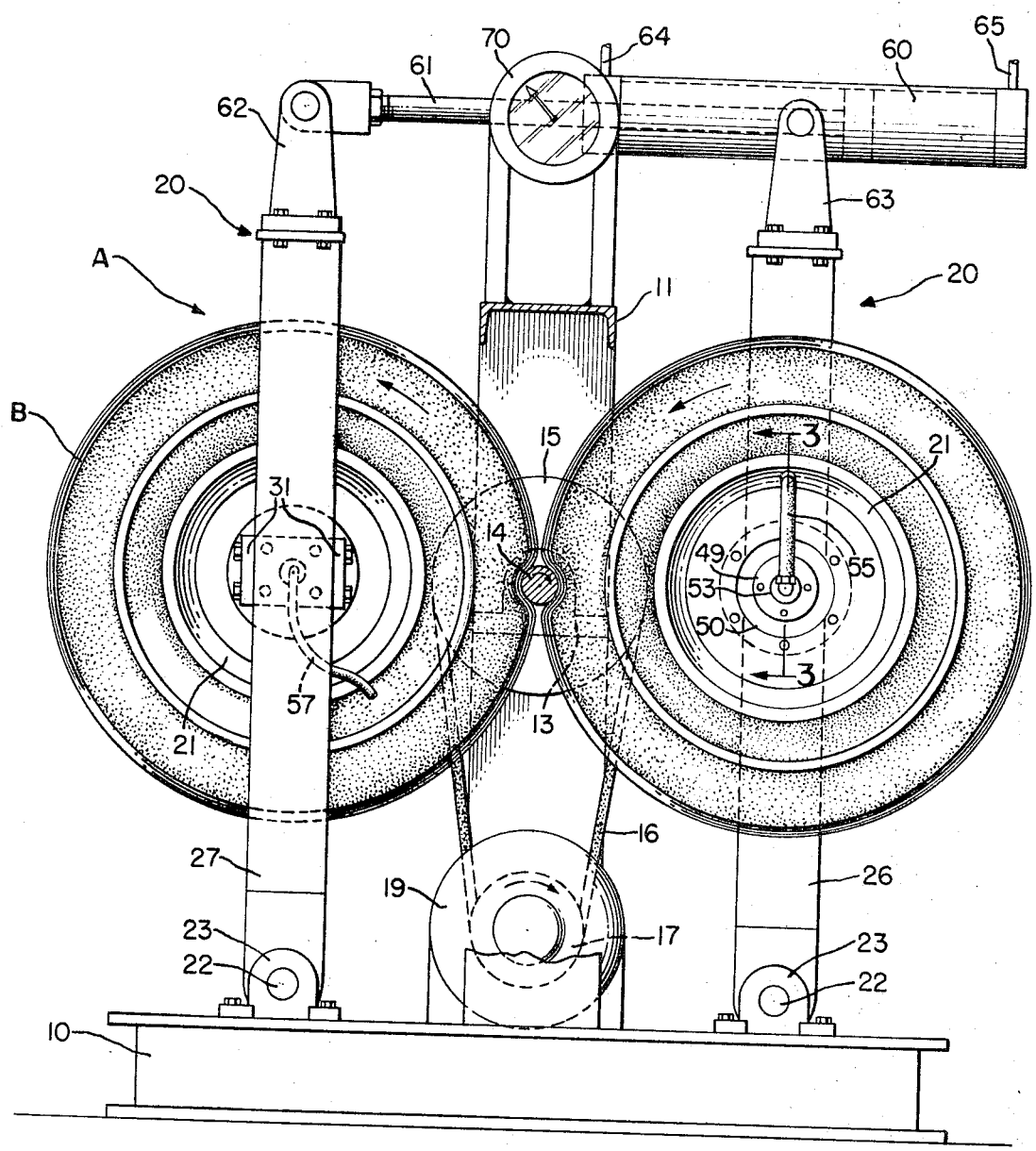
FIG. 1 is a side elevational view showing an apparatus for performing the pre-service conditioning steps in the processing or conditioning of pneumatic tires according to the present invention.

FIGS. 1 to 4 illustrate one form of apparatus suitable for carrying out the pneumatic tire processing method of the invention. It will be seen that the apparatus A is suitable for processing two pneumatic tires or tire members B simultaneously; however, tires may be processed one-at-a-time if desired.

The apparatus A includes a base 10 having a central upright frame 11 mounted thereon, the frame being formed of steel channels welded together to form a rectangular structure. Bolted to opposite sides of the frame 11 are angle brackets 12 which support bearing blocks 13. The bearing blocks 13 have a shaft 14 with a diameter of about 4 inches journaled therein to deflect and rotate the tires B during the conditioning process.

Figure 2:
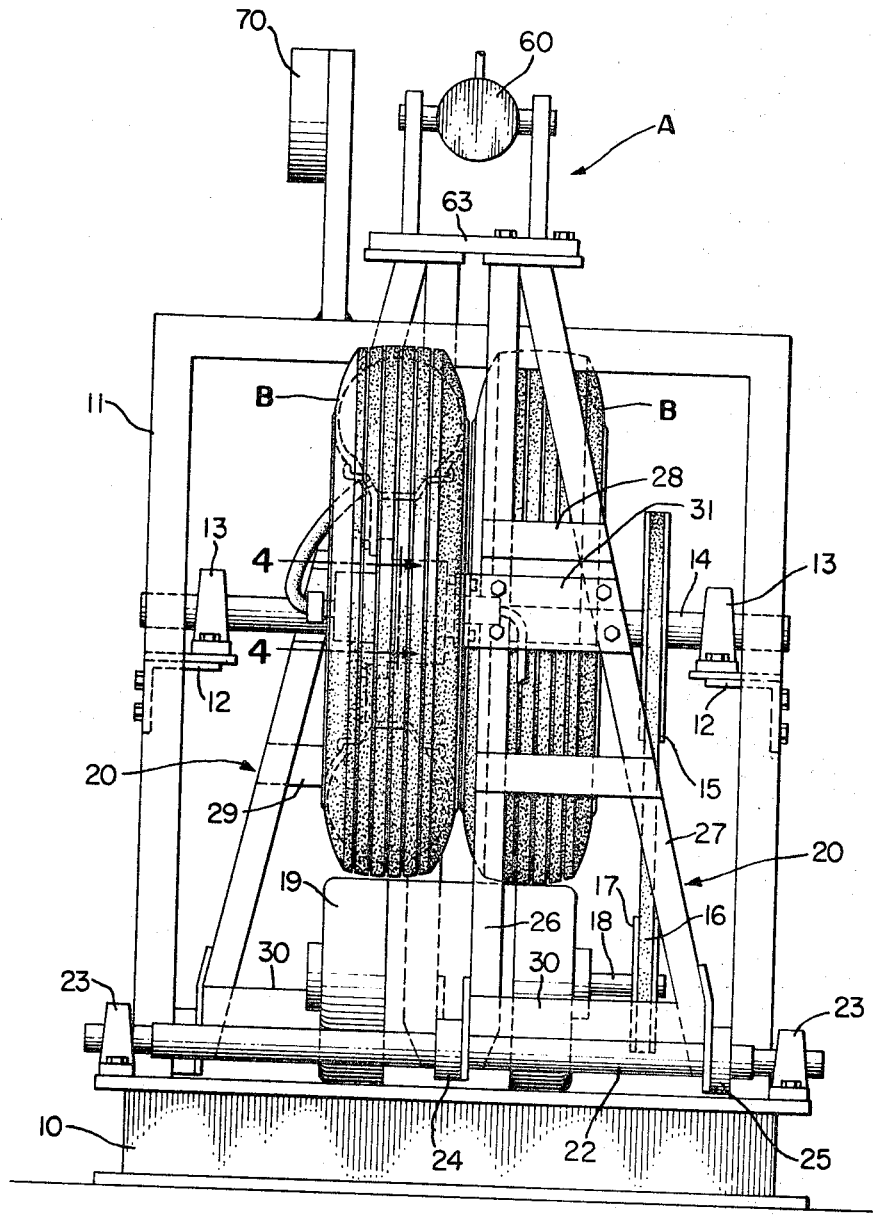
FIG. 2 is an end elevational view of the apparatus of FIG. 1.
Figure 3:
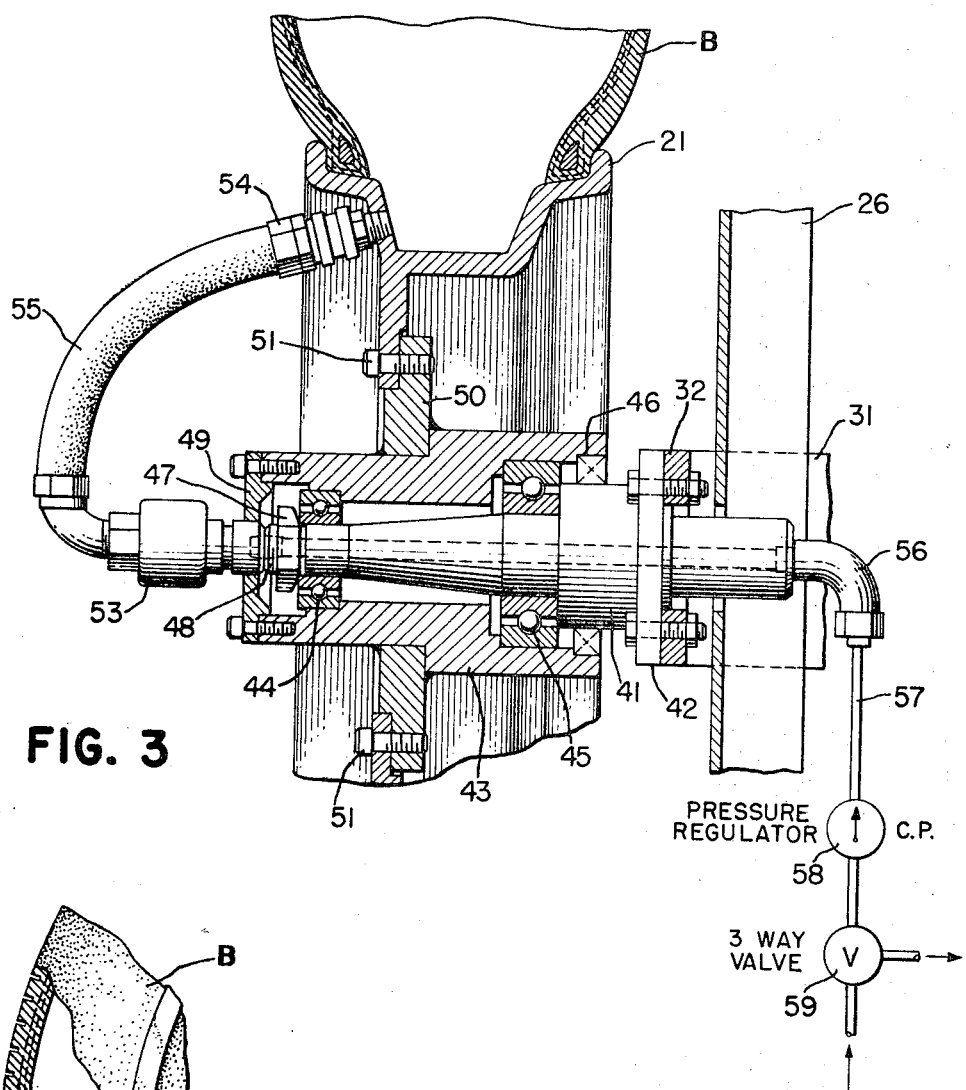
FIG. 3 is a fragmentary sectional view on an enlarged scale taken generally along the line 3—3 of FIG. 1.

Keyed to the shaft 14 between the bearing blocks 13 is a pulley 15 driven by a V belt 16. The V belt 16 is driven by a drive pulley 17 mounted on the output shaft 18 of an electric motor 19, secured to the base 10. Two identical tire carriage assemblies 20 are mounted on opposite sides of the central upright frame 11 with each assembly being adapted to support one of two tire mounting rims 21 facing in opposite directions (FIGS. 1 and 2). Each assembly 20 is affixed to a pivotal shaft 22 having its ends journaled in bearing blocks 23 secured to the base 10. Affixed to each shaft 22 are spaced couplings or trunnions 24 and 25 mounted at the bottom of each assembly 20.

Each assembly 20 has a triangular frame formed of steel structural members including a vertical leg 26 and a diagonal leg 27 which intersect at the top of the frame. The legs 26 and 27 are connected to one another by spaced cross members 28, 29 and 30. Mounted on the legs 26 and 27 between the cross members 28 and 29 is a U-shaped bracket 31 which has its legs bolted to opposite sides of both legs 26 and 27 and has its base portion 32 (FIG. 3) positioned to provide a mount for a wheel hub assembly 40. The wheel hub assembly 40 includes a fixed axle 41 having a flange 42 which is bolted to the base portion 32 of bracket 31.

A rotary hub 43 and its tire mounting rim 21 are rotatably mounted on the fixed axle 41 by tapered roller bearing units 44 and 45 located between the fixed axle and the rotary hub in the conventional manner and an oil seal 46 is positioned between the axle and the inner end of the hub. The hub 43 is held on the fixed axle 41 by means of a retaining nut 47 on the threaded end 48 of the axle 41 and the outer end of the hub 43 has a cap 49 bolted thereon. A rim mounting flange 50, having circumferentially spaced bolt holes, is welded to the hub 43 to receive the tire mounting rim 21, which is secured by bolts 51 in the conventional manner.

The fixed axle 41 has a central passage 52 extending therethrough which communicates at its outer end with a rotary coupling 53. The coupling 53 is connected to the air fitting 54 on the rim 21 by a flexible hose 55 so that the pressure of the air introduced through the central passage 52 to inflate the tire may be varied during the operation of the apparatus A. The rotary coupling 53 serves to accommodate the rotary movement of the fitting 54 as the tire rotates. The other end of the central passage 52 communicates with a fitting 56 which in turn is connected to an air pressure line 57. Located in the air pressure line 57 is a pressure regulator 58 which serves to maintain constant at any selected value the air inflation pressure within the tire being conditioned to accommodate temperature variations which might otherwise cause pressure changes. Inflation and deflation of the tire is controlled by a three-way valve 59.

Referring again to FIGS. 1 and 2 it will be seen that the tire carriage assemblies 20 are connected to one another by means of fluid powered double acting cylinder 60 and piston rod 61 as a contractable line with the fluid being gas, liquid, air, etc. but specifically here described as air. The piston rod 61 is pivotally connected to a bracket 62 bolted to one of the tire carriage assemblies 20 and the air cylinder 60 is pivotally connected to a bracket 63 bolted to the other tire carriage assembly.

When tires to be processed according to the invention are mounted on the rims 21 and inflated to the desired pressure, the piston rod 61 may be moved in air cylinder 60 in its contraction stroke to force the tires against the shaft 14 and deflect the tread portion radially inward (FIG. 4) an amount depending upon the radial force applied with the cylindrical periphery of shaft 14 having a rolling contact with the annular or circumferential surface formed by the tread on tire B. For mounting and removal of the tires however, the cylinder 60 is operated in the reverse direction (by expansion or extension stroke) to separate the tires from the rotating shaft 14. Air pressure to the cylinder 60 is supplied and exhausted through air pressure lines 64 and 65.

When only one tire is to be processed on the apparatus A, one of the tire carriage assemblies 20 is held stationary relatvie to the central upright frame 11 by means of clamps or other suitable retaining means.

The amount of deflection of the tread portion of each tire caused by pressing it against the shaft 14 is dependent upon the diameter of the shaft 14, the radial force applied by means of air cylinder 60, and the tire inflation pressure. In order to assure the same deflection in a group of tires being processed, it is therefore desirable to use the same radial force and the same tire inflation pressure in each instance. For this purpose, air pressure regulator 58 is used and an air pressure gauge 70 may be provided for sensing the air pressure in the left end of cylinder 60 and may be mounted on the central frame 11 as shown in FIGS. 1 and 2.

In the operation of the apparatus A in accordance with the improved processing method of the invention, either one or two freshly molded tires B are taken from the vulcanizing mold or molds and preferably within a few minutes thereafter, are mounted on the rims 21 using conventional tire mounting techniques. The regulator 58 is set to the desired inflation pressure and the three-way valve 59 for each tire B is operated to inflate this tire on its rim 21. The tire at this point is relatively hot—approximately the temperature of the vulcanizing mold, which may be in excess of 300° F. In order to prevent variations in the inflation pressure of the tire as it cools, the pressure regulator 58 will adjust the pressure as necessary.

With the tires thus mounted on the tire carriage assemblies 20, a predetermined air pressure is supplied to the air cylinder 60 to force the piston and piston rod 61 further into the cylinder and bring the tire carriage assemblies 20 together to force the treads of their respective tires B against the shaft 14 for radially loading the tires as a load-applying member having a rolling contact relative movement with the tire tread and exerting a radial inward load or force on the tread. The desired deflection of the tires (the difference between the normal tire radius and the minimum radius at the point of application of the load) is provided by assuring that the radial force applied by means of the cylinder 60 is correct for the circumstances. This may be monitored by the operator using the pressure gauge 70.

The tires may be started in the conditioning process either by radially loading the stationary tires B by shaft 14 and subsequently starting up motor 19, or by first starting up motor 19 and subsequently pulling the tires B against shaft 14 for radially loading and rotatably driving the tires.

Electric drive motor 19 is energized to turn the shaft 14 which in turn rotates the tires in opposite directions with shaft 14 and both tires B rotating about parallel axes. A typical rotary speed for the shaft is 600 r.p.m.; although, the speed is not especially critical and other speeds may be suitable. It is usually desirable, however, to perform a maximum amount of mechanical working of the tire while it is still relatively hot and continuing to cure.

Preferably the rotation is continued in one direction for a substantial period of time and then reversed in order that each tire will rotate in both or alternate directions during the conditioning process. While this is not absolutely necessary it assures good results by giving the leading and following portions of the carcass cords the same treatment.

The conditioning of each tire B on apparatus A is continued until the temperature of the tire has been reduced sufficiently so that the aforedescribed reaction of the fibers and cords to the temperature of the tire and/or the curing of the tire is substantially complete so that the desired uniformity of the tire has been obtained and will be maintained during the later service life of the tire.

It should be apparent that variations in the construction of shaft 14 come within the scope of the present invention. First, if the tires are rotatably driven by motor 19, shaft 14 could be held stationary to obtain some but not all of the advantages of rotatable shaft 14. Second, the peripheral shape of shaft 14 may have a generally cylindrical surface with any desired contour necessary to get the desired loading of different portions of the tire tread. Shaft 14 is shown and described herein as having a uniform diametered cylindrical surface periphery in the form of two parallel lines in diametrical and longitudinal section. However, the periphery of shaft 14 may have a cylindrical surface with a convex, concave, stepped, continuous curve or wave, etc. form in said section, or any variation thereof. For example, a convex form might be used for a reverse molded tire and a concave form for a high molded tire to obtain the benefits of the present invention by having the periphery of the shaft more closely conform to the tread of the tire as molded, in diametrical and longitudinal section.

The total conditioning time will vary depending upon the particular circumstances. However, a suitable time required to achieve good results will in most instances be at least equal to the duration of the mold cycle or in other words the period of time in which the tire remains in the vulcanizing mold during forming and curing. Other factors which determine the conditioning time required include the composition of the rubber in the tire carcass, the composition or kind of the reinforcing tire cords, the number of plies and belt, the size of the tire, the speed of rotation during the conditioning process, the amount of radial deflection, the axial length of the tire tread, the axial distance between the tire beads, and the tire inflation pressure.

The principal parameters in addition to the time of rotation, which affect the results of the conditioning process, are the inflation pressure and the amount of deflection of the tire against the shaft. The preferred inflation pressure and deflection in each instance will again depend upon such factors as the size of the tire, the composition of the rubber, the type or kind of reinforcing tire cords, the number of plies and belt, and the duration of the vulcanizing mold cycle. Inflation pressure selected for use is generally some pressure within a range extending from a predetermined low pressure to a high pressure (less than tire bursting pressure) with these predetermined low and high pressures being respectively about 20 and 40 p.s.i. for some conventional passenger tires and with truck tires able to use a higher high pressure. Deflections of 3 percent to 27 percent of the tire section height above the tire flange have been used.

While the best conditions for each set of circumstances will vary, the adjustments may be readily made by rough estimation to achieve the advantages of the invention and the results may then be optimized by experimentally varying the aforementioned factors and parameters. Those skilled in this art should be able to select the conditions for specific circumstances after careful consideration of this disclosure.

It should be apparent that numerous variations and modifications come within the scope of the present invention with some of these given hereafter in the following eight numbered paragraphs.

First, the exterior load on the tire being conditioned may be a radially inwardly applied radial load, as disclosed heretofore, applied to the outside circumference of the tire; a lateral load (generally parallel to the axis) against the sidewall of the tire; or an oblique load against the tire tread, shoulder or sidewall having radial and lateral (parallel to the axis) force component thereof. A force of a given magnitude generally provides a greater reduction in radial force variation when applied as a radial load instead of as a lateral load, but it should be apparent that even a lateral load will provide some improvement in this radial force variation since it will provide alternate stressing and relieving of tire cords during rotation of the time, Although the present invention emphasizes and uses as an example minimizing radial force variation, tires are frequently tested for lateral or axial force variation in a similar manner and minimizing this lateral force variation (even though not generally as important as minimizing radial force variation) by using the aforedescribed lateral, oblique or even radial load comes within the scope of the present invention.

Second, shaft 14 may be eliminated and the exterior load may be obtained by having the exterior surface of two tires roll against each other with each tire serving as the load applying member for the other, such as by having tire treads roll against each other when the tire rotational axes are parallel, by having the tread of one tire roll partially on the tread, shoulder or sidewall of the other tire with the tire rotational axes acutely or right angularly related for transmitting an oblique or lateral loading between the tires, etc. However, it should be readily apparent that the small diameter shaft 14 in FIG. 1, with its smaller radius of curvature shown in FIG. 4 than on a tire, will cause a larger localized tire deflection and cord stretching than the aforedescribed two rotatably engageable tires.

Third, although the constant air pressure obtained by using pressure regulator 58 will generally assure more uniform radial force variation and tire quality since the tire inflation pressure will remain constant during the entire tire conditioning process in spite of temperature variations caused by the hot tire, it should be apparent that some advantages of the present invention would be obtainable by using a single charge-type air inflation of the tire prior to the conditioning to last for the whole conditioning process instead of trying to maintain the inflation pressure constant.

Fourth, any suitable contractable link may be used to pull tire carriage assemblies 20 toward each other and against shaft 14 therebetween, instead of fluid powered cylinder 60 and piston rod 61 disclosed. For example, this link might include a screw rotatably connected and pivotally connected (about an axis parallel to the axis of rotation of the associated tire) to the top of one of the brackets 62 and 63 and a nut pivotally connected to the top of the other bracket about a parallel pivot axis so that upon rotation of the screw in opposite directions, the top of bracket 62 and 63 will advance toward, or move away from, each other in basically the same manner as the spaced pivots on fluid powered cylinder 60 and piston rod 61.

Fifth, it should be apparent that, although motor 19 rotates shaft 14 to drive tires B, motor 19 could instead drive one or both tires B by suitable drive means directly through their associated hubs 43, instead of by rotatably driven shaft 14, which shaft 14 would then be free to be rotated by the driving action of the driven tire or tires.

Figure 4:
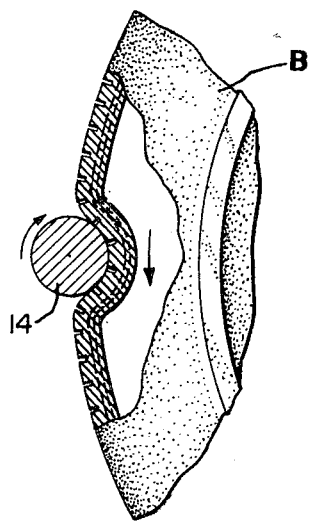
FIG. 4 is a fragmentary sectional view on an enlarged scale taken generally along the line 4—4 of FIG. 2 with parts broken away for the purpose of illustration.

Sixth, although the periphery of shaft 14 is shown in FIGS. 1 and 4 as making a rolling contact type relative movement on the tread of each tire B to cause the exterior load on and radial inward deflection of the tire, any type relative movement between the load and tire exterior may be satisfactory. For example, a tire rotating about an axis and being conditioned, may have an annular or circumferential exterior tire surface (comprising the tread, sidewall or shoulder of said tire) having a rolling contact type relative movement with a load-applying member: having the generally cylindrical peripheral surface of shaft 14 rotating about a parallel axis: having the generally cylindrical surface of the tread of another tire rotating about a parallel axis and being conditioned, as explained earlier in the paragraph starting as "Second"; having a planar or curved surface (similar to the tire contact with pavement during use on a vehicle) on a wall, floor, endless belt, sheet or web pressed against the exterior tire surface; or having a generally cylindrical bore surface of a ring rotatable about a parallel axis with the bore being of larger diameter than the exterior surface of the tire with which it engages. Also, the relative movement may be a sliding contact instead of a rolling contact, with any annular or circumferential tire exterior surface to obtain some of the advantages of the present invention by having the rotating tire tread engage a relatively low friction surface carried by a stationary member and having a convex radius of curvature on its tire engagement portion, such as on roller 14 if held stationary, to provide this exterior load. This sliding contact would generally have more friction and be less desirable than a rolling contact.

Seventh, each one-piece tire mounting rim 21 and each associated hub 43 may be replaced by a fluid pressure actuated tire chuck for permitting quick tire mounting on and removal from axle 41, especially under production conditions. This chuck may be of any suitable conventional type having fluid pressure actuated, radially outwardly and inwardly movable, arcuately shaped, tire mounting rim portions, or having relatively axially movable tire bead flanges for mounting or moving the tire therebetween since these flanges are movable axially together to form the tire bead straddling portions of a tire mounting rim on axle 41.

Eighth, a plurality of radial load shafts 14 may be arcuately spaced around the tread of the tire to condition the tire more quickly.

Apparatus A in FIG. 1, and suitable modifications thereof, has a simple, inexpensive construction especially adapted for use with conventional tire curing machines having two tire curing molds. Apparatus A can condition simultaneously two tires B, after they have simultaneously finished their processing in the two mold cavities, by simultaneously pressing both tires against shaft 14. Then, single motor 19 rotatably drives single shaft 14 for simultaneously conditioning both tires B by shaft 14 simultaneously applying an exterior radial load to, and rotating, both tires.

Test runs of different tires brought out the advantages of this invention. A plurality of tires of the same construction and mold cure were subsequently processed in a test run to compare non-conditioned tires with tires conditioned by the process disclosed herein. Each test run was run at one or more inflation pressures and radial deflections. Different test runs had tires of different sizes, types (passenger or truck tires), constructions, mold cures and/or kinds of tire cords, such as nylon or polyester. The non-conditioned tires did not have the radial forces applied thereto but were inflated and exposed to generally the same ambient conditions after being removed from the mold; conditioned tires were conditioned by a radial load applied thereto by a uniform diametered, cylindrical, rotatable shaft, of at least four inch diameter rotatable about an axis parallel to the axis of rotation of said tire; and by rotation and loading of the tire being continued through the same time period as the vulcanizing mold cycle in which the tire was processed, and being continued at least five minutes in at least one direction.

After the conditioned and non-conditioned tires in each test run had been thus processed, they were individually tested for radial force variation using suitable inflation pressure, such as 24 p.s.i. for some passenger car tires, and a suitable radial load, such as about 700 pounds, applied by means of a 10 inch drum rotating at 12 r.p.m. on an axis parallel to the tire with the periphery of the drum bearing against the tire tread while the drum and tire were approximately coplanar. The relative positions of the drum and the tire were fixed during the test. The radial force variation was measured by a load cell, and this variation may be defined as the variation in pounds above or below the initial 700 pound radial load as the tire rotated against the 10 inch drum.

It was found in the test runs that tires conditioned according to the invention disclosed herein consistently had a smaller radial force variation than comparable non-conditioned tires. Although the degree of improvement varied with some of the earlier mentioned factors and parameters, it was found that conditioned tires may have as high as a 30 percent reduction in radial force variation in comparison with non-conditioned tires. When the radial deflection exceeded 27 percent of the tire section height above the tire flange, less desirable radial force variation was obtained.

One test run has been given herein as an example. Since the total radial force applied during the radial force variation test was about 700 pounds, the non-conditioned tires had an average radial force variation of 24.5 pounds or about 3.5 percent (24.5/700=3.5%). Since the radial force variation in a specific sample of tires in this test conditioned at a given set of factors and parameters was about 17 pounds or about 2.4 percent (17/700=2.4%), this example would indicate total improvement as high as 30 percent for tires conditioned and processed in this test run according to the invention.

While only a preferred form of the tire conditioning apparatus and processing method is illustrated and described it will be understood that variations and modifications may be made by those skilled in the art without departing from the spirit of this invention. This invention therefore is not to be limited to the particular method and apparatus herein shown and described nor in any manner inconsistent with the extent to which the progress in the art has been advanced by the invention.

What is claimed is:

1. A method of conditioning a pneumatic tire shortly after its removal from a mold in which the finished tire is formed and while the tire retains heat from the mold, comprising the steps of:
    (a) inflating the tire with fluid shortly after the tire is removed from the mold; and
    (b) deflecting the tire inwardly and completely around the tire at successive circumferential increments while the tire retains heat from the mold and before it cools to the ambient temperature.

2. A method, as defined in claim 1, with
    said deflection being between three percent and twenty-seven percent of the tire member section height above the tire flange.

3. A method, as defined in claim 1, with
    said tire member being inflated to a pressure of over twenty p.s.i. and less than its bursting pressure.

4. The method as defined in claim 1, wherein the step of deflecting the tire includes applying a load externally against the tire;
    and causing relative movement between the tire and the load applied against the tire.

5. A method, as defined in claim 4, with
    said relative movement being continued for at least five minutes.

6. A method, as defined in claim 4, with
    said relative movement being continued for a time interval at least equal to the cycle of the vulcanizing mold in which the tire was processed.

7. A method, as defined in claim 4, with
    said relative movement being in alternate directions.

8. A method, as defined in claim 4, with
    said exterior load being radially inwardly applied to the outside circumference of said tire.

9. A method, as defined in claim 8, with
    said radial load being applied by a rotatable shaft member while said tire and shaft member rotate about prallel axes.

10. A method, as defined in claim 9, with
    two of said pneumatic tire simultaneously pressed against said shaft for simultaneously applying said exterior loads to both tires for simultaneously conditioning said two tires.

11. A method, as defined in claim 10, with
    said tires being pulled toward each other with said shaft therebetween for radially loading said tires.

12. The method of claim 4 wherein the tire is rotatable and the load is applied by a member at a fixed position relative to the rotating tire.

13. A method, as defined in claim 12, with
    said exterior load being applied to said tire by a generally cylindrical surface on said load-applying member.

14. A method, as defined in claim 13, with
    rolling contact relative movement obtained by rotating said tire and load-applying member about parallel axes.

15. A method, as defined in claim 13, with
    said exterior load being a radially applied load on said tire by the cylindrical peripheral surface on a rotatable shaft as said load-applying member.

16. A method, as defined in claim 15, with
    said exterior load being applied by said shaft having a smaller radius of curvature than on said tire.

17. A method, as defined in claim 15, with
    said exterior load being applied by said shaft having a uniform diametered cylindrical peripheral surface.

References Cited

UNITED STATES PATENTS

| | | |
|---|---|---|
| 1,920,852 | 8/1933 | Feinen. |
| 2,193,119 | 3/1940 | Bailey _____ 264—346 X |
| 2,866,500 | 12/1958 | George et al. |
| 2,963,737 | 12/1960 | Soderquist. |
| 3,039,839 | 6/1962 | Waters et al. |
| 3,127,916 | 4/1964 | Robertson et al. |
| 3,214,791 | 11/1965 | Ericson et al. |
| 3,389,193 | 6/1968 | Hughes _____ 264—230 X |

ROBERT F. WHITE, Primary Examiner

T. J. CARVIS, JR., Assistant Examiner

U.S. Cl. X.R.

18—2; 264—347